Figure 1:
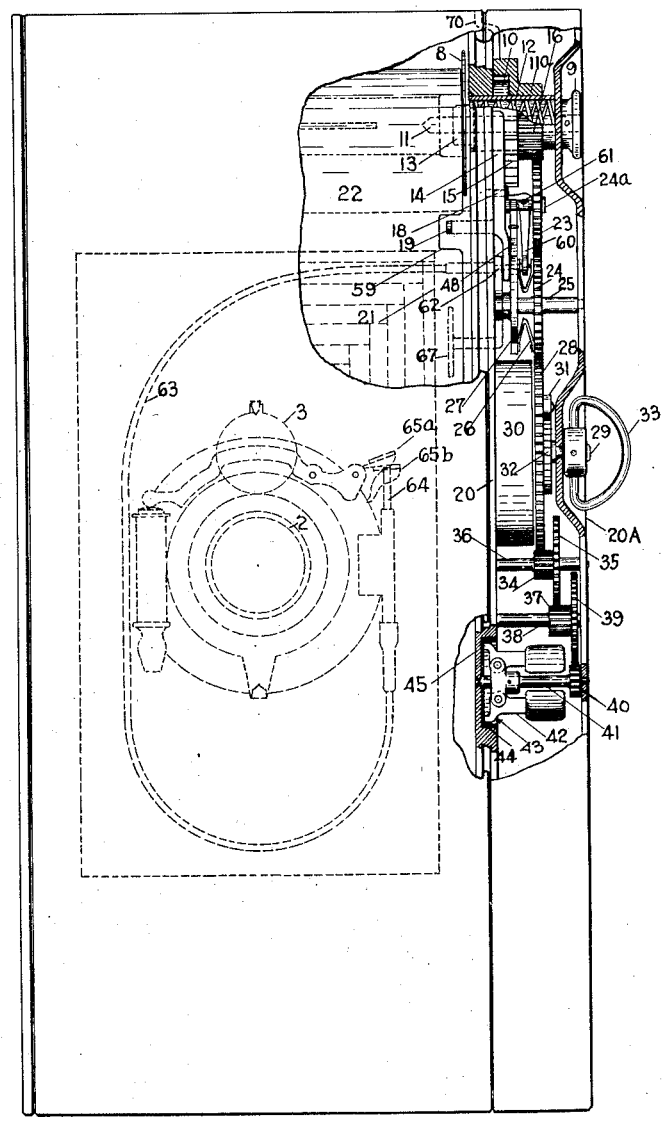

L. W. ROSEN AND P. BRAUNER.
FILM SHIFTING DEVICE FOR CAMERAS.
APPLICATION FILED FEB. 26, 1918. RENEWED MAY 11, 1920.

1,386,733.

Patented Aug. 9, 1921.
2 SHEETS—SHEET 1.

WITNESSES:

INVENTORS

L. W. ROSEN AND P. BRAUNER.
FILM SHIFTING DEVICE FOR CAMERAS.
APPLICATION FILED FEB. 26, 1918. RENEWED MAY 11, 1920.

1,386,733.

Patented Aug. 9, 1921.
2 SHEETS—SHEET 2.

WITNESSES:

INVENTORS

UNITED STATES PATENT OFFICE.

LOUIS W. ROSEN AND PINCUS BRAUNER, OF NEW YORK, N. Y., ASSIGNORS, BY DIRECT AND MESNE ASSIGNMENTS, TO ADOLPH E. BRION, OF NEW YORK, N. Y.

FILM-SHIFTING DEVICE FOR CAMERAS.

1,386,733. Specification of Letters Patent. Patented Aug. 9, 1921.

Application filed February 26, 1918, Serial No. 219,256. Renewed May 11, 1920. Serial No. 380,649.

*To all whom it may concern:*

Be it known that we, LOUIS W. ROSEN and PINCUS BRAUNER, citizens of the United States, and residents, respectively, of the county of New York and the county of Bronx, both in the city and State of New York, have invented a new and useful Improvement in Film-Shifting Devices for Cameras, of which the following is a specification.

The object of our invention is to provide a device and means whereby it would be possible not only to take successive pictures on a roll of film in rapid succession merely through the normal operation of what is essentially the shutter mechanism, and where the film is automatically caused to advance only after completion of any set exposure; but also to manipulate the film cartridge with greater speed in loading and unloading the same than is possible under any method known to us, so that very little time would elapse between completion of exposure on the last portion of one film and the taking of an exposure on the first portion of the succeeding film.

By controlling the film shifting mechanism direct from the integral shutter mechanism, instead of having such control depend upon any of the auxiliary means used for operating the shutter, we keep clear of having this control become inoperative when the auxiliary means becomes out of order. This condition very often arises in the conventional camera, and in which instance the operator resorts to the safety trigger forming a part of the shutter mechanism directly from which we lead our control; and we utilize the normal operation of this trigger when taking an exposure, independent of any other power or means, to actuate said control and thereby cause the film to shift.

It is obvious that the common danger of double exposure is avoided by this device, and which benefit, among others, is included in our former Patent Number 1,253,205, issued January 15th, 1918. Along with this, however, we have here provided means whereby the operator would be able to note by the automatic permanent locking of the shutter mechanism that the entire roll of film has been exposed. The object of providing such means is to avoid the danger in an automatic film shifting mechanism of this sort, of continuing the operation of the shutter for additional exposures with the mistaken notion that the entire roll of film had not yet been exposed. This error would be apt to occur because the operator, not having to wind the film by hand, as in the conventional camera, and accordingly watch for the next number appearing on the paper covering the film, as a signal to stop, would, because of relief from attention to these numbers, very often depend upon his memory as to how many exposures it would still be possible to take. Then again, when successive exposures are taken in rapid succession, there is no time or convenience between exposures for observing any mark whatsoever, the eyes of the operator being fixed on the object or objects photographed. In fact, in our device, the co-extensive light-proof paper for the purpose of showing numbers, is unnecessary, as the entire roll of film including the terminal portions of paper extending beyond each end are shifted the proper distances automatically as soon as one end of the preceding paper or strip is attached to the take-up roller in sufficient length to make it secure and the back cover of the camera replaced.

The means we employ makes it possible to operatively engage automatically the film, and any paper that it may carry, with the film shifting mechanism immediately upon replacing the camera cover as above, and which, with other arrangements, is designed to bring about the speed in loading and unloading of the film as before mentioned.

All our operations are conducted without resort to any fluid pressure, as we feel that we cannot depend upon that as an effective and permanent means, being subjected to leakage and other dangers that affect operation.

These and other objects are accomplished by our invention, some embodiments of which are hereinafter set forth.

For a more particular description of our invention, reference is to be had to the accompanying drawings, forming a part hereof, in which, Figure 1 is a rear elevation, partially in section, of a camera provided with our improvement.

Figure 2:
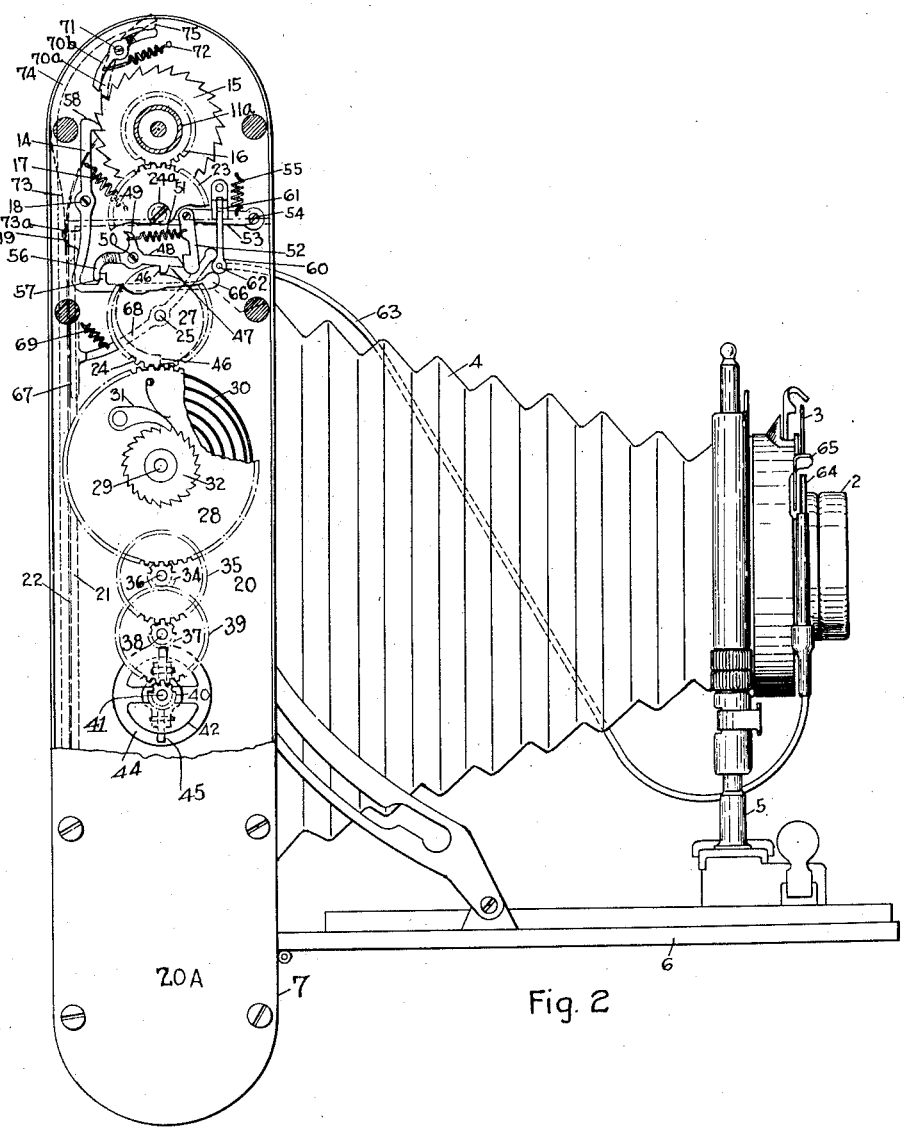

Fig. 2 is a side elevation of the same, with parts removed to more clearly reveal the structure involved.

The kind of a camera to which our improved film shifting mechanism may be applied is here designated generically by the character 1. Such a camera has a lens holder 2 with its attendant parts, a shutter mechanism 3 and, in the better class of cameras, a bellows 4 with a support 5 rising from the hinged front 6. The front 6 is suitably connected to a casing 7 of the conventional kind, and in which are mounted at both ends the usual rollers 8 for films, one to supply and the other to take on the film in the conventional manner. The take-on roller 8 is connected in the conventional manner to its handle 9, which is connected to roller ratchet 10, small shaft 11 and spindle 11$^a$, and about this shaft 11 is placed a coiled spring 12, which causes a suitable projection or key 13 to enter into a corresponding recess in the spool or take-up roller so that said roller may turn in the usual way when the spindle 11$^a$ rotates, or the shaft 11 may be withdrawn from the spool in the usual way when the spool is inserted or removed. The upper end of the dog 14 engages a suitable ratchet wheel 15 which is mounted so as to turn on the hollow spindle 11$^a$, to which spindle one end of the take-up roller is secured by means of shaft 11 connected with the spindle and running through its hollow center as above described. Fixed to the ratchet wheel 15 and turning on the same shaft with the same annular velocity as the ratchet wheel 15 is a spur gear 16. The shaft or spindle 11$^a$ is provided near one end with suitable ratchet teeth or cams 10 which are adapted to engage rollers that run on the interior of the ratchet wheel 15, so that when desired the spindle 11$^a$ may be turned by means of the handle 9 in the conventional manner without causing any movement of the ratchet wheel 15 or gear 16 fixed thereto; and on the other hand, the rotation of the ratchet wheel 15 in a clock-like direction will cause a corresponding rotation of the shaft 11. The dog 14 is normally kept in engagement with ratchet wheel 15 by the spring 17. Below the pivot 18 of said dog and attached to said dog is a small shoe 19 sloped as shown in Fig. 2. The arm of said shoe is bent at right angles to the housing wall 20 so as to penetrate through a suitable slot in said wall and then bent parallel with said wall so as to reach a plane somewhat above the surface of the frame 21 upon which the passing film 22 rests; so that when said shoe is depressed against the tension of spring 17 by action of the film 22 sandwiched between said shoe and spring 73 of the back camera cover 74, the dog 14 will be released from the ratchet wheel 15 and allow said wheel to rotate.

The mechanism for driving the gear 16 will now be described. The gear 16 meshes with a gear 23 which is suitably mounted on shaft 24$^a$ journaled in the housing wall 20, and this gear 23 meshes with a gear 24 suitably mounted on shaft 25, and which gear 24 has fixed thereto on the inner surface the springs 26 bearing against the opposite surface of the snail cam 27 loosely mounted on shaft 25. The gear 24 meshes with a suitable gear 28 mounted on an arbor 29 to which arbor is secured one end of a main spring 30 together with a suitable pawl 31 and ratchet 32, and this spring 30 may be wound by means of a handle 33 mounted on the arbor 29, which handle 33 may be folded into a suitable recess in the housing wall 20$^a$.

Meshing with gear 28 is a pinion 34, fixed to a larger gear 35 and mounted on shaft 36, and the gear 35 meshes with a corresponding pinion 37 on a stud shaft 38, and this pinion 37 is fixed to a gear 39 which meshes with a pinion 40 on a shaft 41, and the pinion 40 is fixed to this shaft 41 which drives a centrifugal governor 42 fixed to operate in a suitable recess 43 containing a friction disk 44 in contact with wall 20, so that the gear 28, through a train of gears, drives the shaft 41, which makes the weights on the governor 42 fly away from the shaft 41 and forces the toes 45 of said governor against the disk 44 and thereby act as a positive brake to retard the speed of rotation of the gear 28 and all that is driven by it and keep this speed within due and proper limit.

The mechanism for starting and stopping the film shifting mechanism will now be described. The shaft 25 has mounted thereon the gear 24 to which is attached the springs 26 bearing against the snail cam 27 loosely mounted on said shaft 25, which cam has one or more teeth 46, which tooth normally engages a corresponding tooth 47 of the pivoted pawl 48. This pawl 48 is also provided with a laterally extending arm 49, which is adjacent to the pivot 50 which extends from the wall 20 as shown in Fig. 2. The arm 49 engages a suitable coil spring 51 adapted to keep said pawl normally in a bearing down position, and which spring runs to a detent 52 which near its lower end is provided with a suitable notch or recess adapted when lowered and subsequently elevated by mechanism which will be described below to receive, in the first instance, the end of the pawl 48 and, in the second instance, move the same away from the tooth 46. Immediately after this tooth has been thus cleared it will, by the resulting clockwise rotation of the cam 27, impinge against the lower end of the detent 52 and cause said detent, against the tension of the spring 51, to be separated from the pawl 48 and beyond the possibility of a further engagement with said pawl until the said detent is again lowered in the manner above described. The detent 52 at its upper end is pivotally connected to a short lever 53, pivoted to the wall 20 at 54, and also connected to the said wall by a suitable coil spring 55 near said pivot, so that this lever 53 is normally kept elevated and the detent 52 is normally kept, as shown in Fig. 2, with its recess clear of the end of pawl 48. When this lever 53 is forced downwardly, as it is momentarily, by mechanism described below, the spring 51 will cause an engagement of the end of the pawl 48 and the detent 52, and then the spring 55, as soon as the depressing force is removed, will momentarily raise the pawl 48 and cause the teeth 46 and 47 to separate. The raising of the pawl 48 by the detent 52 will cause the toe 56 to press against the tooth 57 of the dog 14 and move said dog about its pivot 18. This will release the tooth 58 of said dog from engagement with ratchet wheel 15 and simultaneously withdraw the small shoe 19 from engagement with the notch or hole 59 in the film 22. This unlocks the film shifting mechanism, causing the gear 24 to be driven by the main spring 30 through the connections above described so as to rotate with the cam clockwise. Immediately after the commencement of this rotation the tooth 46 impinges against the lower end of the detent 52 and forces the same away from the pawl 48 against the tension of the spring 51, as above described, and this separation continues only until the pawl 48 and detent 52 are again brought into engagement as described below. During the course of this rotation the spring 51 will continue to bear down the pawl 48 on the periphery of the cam 27 in peripheral line with the tooth 46. As soon as tooth 46 of the cam 27 reaches engagement with the tooth 47 of the pivoted pawl 48, the said cam 27 will be held from rotating any further without interference, however, with the proper movement of the rest of the mechanism. This is accomplished by action of the springs 26 attached to the gear 24 bearing against said cam firmly and with sufficient force only to have said cam rotate with said gear 24 and also to separate the detent 52 from the pawl 48 against the tension of spring 51, but when the tooth 47 is reached as above stated the said springs 26, instead of remaining stationary on the surface of said cam and merely bearing against it as before stated, slide around said surface so as not to obstruct the normal revolution of the gear 24, and continues so to slide until the next hole or notch in the film is brought into engagement with the shoe 19 and the shifting of the film correspondingly stopped as hereinafter described. The return of the pawl 48 to its normal position soon after it is raised as before described does not, however, interfere with the disengagement of the tooth 58 of the dog 14 from ratchet wheel 15 as long as the shoe 19 on said dog is out of engagement with said hole or notch 59. As soon as the succeeding hole or notch 59 reaches said shoe 19, the said shoe will by action of the spring 17 fall into said hole or notch and also reach beyond the plane of the flat spring 73 of the cover 74 at a suitable cut 73ª in said spring, synchronously at which time the tooth 58 on the dog 14 will engage with the ratchet wheel 15 and cause the mechanism to stop. The lever 60 is fulcrumed at 61, and which lever is employed to depress the lever 53 as above described. The said bell crank lever 60 is placed opposite a pin 62 which is connected to a flexible connection 63 which can move this pin in the direction of its length a slight distance so as to cause it to force the bell crank lever 60 to lower the lever 53, as above described. This connection 63 runs to a plunger 64 operating within a suitable bushing against the tension of a spring therein not shown, and which plunger may be impinged by a projection or trigger 65 forming an integral part of the shutter mechanism. It will be noted that if and so long as the trigger 65 depresses the plunger 64, there can be no action with reference to the film shifting mechanism except the engagement of the detent 52 with the pawl 48, because the lever 60 holds the lever 53 in its lower position against the tension of the spring 55. As soon as the lever 60 is released through the release of the plunger 64 by the upward and return movement of the trigger 65, so that the spring 55 can become active, the lever 53 is raised and the detent 52 is correspondingly raised, together with the pawl 48, the toe 56 of which causes a pivoting of the dog 14 and a disengagement of tooth 58 from ratchet wheel 15, and then the action is as above described. The movements of the trigger 65 are essential to actuate the shutter mechanism for an exposure of the film, and these same movements, unaltered, and without the aid of any other means or power, are utilized to synchronously and automatically control the operations of the film shifting mechanism in every instance of exposure as hereinafter more fully described. This trigger 65, for convenience, might be and usually is, controlled from a distance by resort to the different kinds of connections now on the market. These very often become inoperative after some use, in which instance the operator simply falls back on the trigger 65 for operation of the shutter mechanism.

As stated before, the film shifting mechanism will not automatically be set in operation until the desired picture has been taken and the shutter has been opened and closed, to accomplish which nothing more than what is necessary to set and operate the shutter for an exposure must be done, and this holds good whether an instantaneous, so-called bulb, or time exposure is desired. This is successfully accomplished through the normal action of trigger 65 of the shutter mechanism. For an instantaneous exposure, the shutter will both open and close on the depression of said trigger 65, after which said trigger returns to position 65ª as shown in Fig. 1. For a bulb exposure, the shutter opens upon the depression of said trigger and closes at a point before said trigger reaches position 65ª upon its release. For a time exposure, two operations of the trigger are necessary. The first operation opens the shutter and leaves the trigger remaining in position 65ᵇ, in which position the shutter also remains open: the second operation closes the shutter and allows the trigger to return to position 65ª. In all instances it is necessary for the trigger 65 to pass position 65ᵇ on its release before the detent 52 (already interlocked with pawl 48 through the first depression of said trigger) can pivot the pawl 48 sufficiently to cause the dog 14 to become disengaged from the ratchet wheel 15, and so start the shifting mechanism. The reason for this is that the already extended pin 64, leading by connections from the trigger aforesaid, must withdraw from out of the path of the already moved lower end of the bell crank lever 60 so as to allow said bell crank lever to give way to the action of the spring 55 and unless this withdrawal is made sufficiently the said spring 55 will be retarded by said bell crank lever from consummating its design to lift the then depressed detent 52 with engaged pawl 48 in such measure as to pivot the dog 14 from out of engagement with ratchet wheel 15, and thus bring about a shifting of the film; and a sufficient withdrawal is made for that purpose by the pin 62 as soon as the trigger 64 passes position 65ᵇ on its upward movement to normal position.

In order to prevent the shutter from being opened while the film is being shifted, the dog 14 is provided with an extension 66. The pivoting of said dog to disengage it from the ratchet wheel 15 to cause the starting of the shifting mechanism, as before described, also causes said extension 66 to move into the path of the bell crank lever 60, remaining in this last position during all the while that the film is being shifted as before mentioned. This in turn prevents the lever 53 from being depressed through the action of pin 62 against said bell crank lever, and consequently, through the connections shown, the trigger 65 cannot be depressed, thus preventing the shutter from being opened while the film is being shifted. As soon as the dog 14 is brought into engagement with the ratchet wheel 15, as aforesaid, this extension 66 at the same time moves back to the position shown in Fig. 2, out of the path of the bell crank lever 60 and allows the bell crank lever unobstructed space for operation from the direction of trigger 65, for the next exposure.

Adjacent to the cam 27 is a lever 68 pivoted on shaft 25. One end of said lever reaches a position adjacent to bell crank lever 60, and the other end reaches a position extended through the frame 21. At this last mentioned position the said lever 68 terminates and is provided with a shoe 67 longer than the length of the hole or notch 59, the lower end of which is adjusted to prevent interference with said holes or notches as the film passes by. A sufficient portion of the lever 68 preceding the shoe thereon is bent so as to allow it to pass through a suitable cut in the wall 20 and then up again through the frame 21 in the same manner as the shoe 19. In normal position the spring 69 keeps the end of the lever 68 adjacent to bell crank lever 60 in the path of said lever 60, obstructing it so that it cannot be depressed by the trigger 64 and its connections; but as soon as there is any depressing force on said shoe 67, as by action of the film 22 compressed thereon by the spring 73, the said lever 68 will pivot around so as to clear the lever 60 and give it freedom for operation. The result is that it permanently locks the trigger 65 as soon as all the film as well as any terminal paper or covering has been shifted and passed shoe 67. This, as explained before, acts as a reminder to the operator that there is no more unexposed portion of film left with which to take exposures, and he will know this as he futilely attempts to depress the trigger 65.

Above the ratchet wheel 15 is an auxiliary pawl 70 pivoted at 71, adapted through the action of spring 72, normally to engage said ratchet wheel 15, as shown in position 70ª, and prevent the same from rotating. This position is had when the removable back cover 74 of the camera is off. When said cover, however, is replaced, the projection 75 thereon engages the upper end of the pawl 70 and causes the same to pivot to position 70ᵇ from out of engagement with said ratchet wheel 15 and leaves the same free to rotate as soon as the other connections, as before stated, have been made or operated.

*Operation.*

In view of the foregoing, the operation of our invention will be readily understood. When loading the camera with a new film cartridge, the operator first of all removes the cover 74. He then places the film cartridge in the chamber for the supply spool or roller at the lower end of the camera. He then unrolls sufficient of the paper preceding the film to reach the empty take up spool or roller 8 at the upper end of the camera connected to the winding key 13, leading the strip in doing this across the field of exposure and leaving it flat on frame 21. He then attaches or winds on said take-up roller a short length of said paper and only so much as will make it secure for a subsequent winding. He then winds the spring 30 through the handle 33 to the top of its stress. Thereafter he replaces the cover 74 in the conventional manner. Through the action of the projection 75 of the cover bearing against the upper end of the pawl 70, the replacing of the cover will cause a disengagement of said pawl 70 from the ratchet wheel 15 against the tension of spring 72, the said pawl and ratchet, when the cover was off having been held in motor stopping position as shown in position indicated in 70ª in Fig. 2. Simultaneously with the replacing of said cover the spring 73 compresses the film 22 on to the shoe 19 and the shoe 67 against the tensions of springs 17 and 69 respectively. At the start, however, the pressure of the spring 73 rests against the paper preceding the film and which paper in turn depresses the shoe 19. Such pressure on the shoe 19 causes the dog 14 to be pivoted about 18 and disengaged from the ratchet wheel 15. The said ratchet wheel 15 having already been automatically disengaged from both the pawl 70 and the dog 14 by the replacing of the cover, the preceding paper on the film will automatically be shifted at once until the first hole or notch in the film registers with cut 73ª opposite the shoe 19, at which time the said shoe will fall into said hole or notch causing an engagement of the dog 14 with the ratchet wheel 15 and consequently a stopping of the shifting mechanism. The film is then in position for the first exposure. Assuming the parts to be as shown in Fig. 2, before an exposure is taken the shutter mechanism 3 is set in the usual way for either an "instantaneous", "bulb", or any form of time exposure. After the object is sighted in the usual way, the trigger 65 is depressed, and this depresses the plunger 64 which causes a movement of the bell crank lever 60 and a corresponding depression of the lever 53 and an engagement of the detent 60 with the pawl 48.

So long as the shutter mechanism has the trigger 65 depressed, the exposure is taking place (except in the case of instantaneous exposure, when the depression both opens and instantly closes the shutter, completing the exposure instantly), and so long as the trigger 65 remains depressed there is no disengagement between the tooth 58 of the dog 14 and the ratchet wheel 15, so that all parts driven by the main spring 30 remain at rest. As soon as the trigger 65 is raised sufficiently and passes position 65ᵇ as before described, the lever 60, in consequently returning to its normal position, allows the spring 55 to raise the lever 53, as above set forth, and after the lever 60 has withdrawn sufficiently as before stated, the teeth 46 and 47 become disengaged and also the tooth 58 becomes disengaged from the ratchet wheel 15. The teeth 46 and 47 continue disengaged only for one revolution of the cam 27, or fractional revolution according to the number of teeth on said cam. More than one tooth is necessary only where the maximum circumference the winding spool will assume when fully wound, will be of such length as not to allow the train of gears to revolve sufficiently to bring said tooth 46 into engagement with tooth 47, which engagement must occur for effective operation, it being remembered that the winding spool gradually has to revolve less in proportion to the increasing diameter it assumes. However, in the conventional camera it would be hardly necessary for more than one tooth on said cam 27, and at the most two teeth. Simultaneously with the passing of said trigger 65 beyond the position 65ᵇ as before described, the tooth 58 on the dog 14 becomes disengaged from the ratchet wheel 15 and continues disengaged until the succeeding hole or notch in the film reaches and becomes engaged with the shoe 19. It will be understood that the cam 27 is driven from the gear 24 only until the teeth 46 and 47 become engaged, by pressure of the springs 26 attached to said gear 24 exerted on the face of said cam, after the engagement of which teeth the said gear 24 continues to revolve with the springs 26 sliding around the face of said cam until the mechanism is caused to stop by engagement of the dog 14 with the ratchet wheel 15 when the next hole or notch in the film has been reached as before described. That the gear 24 receives power from the gear 28 and transmits power to gear 23, and the gear 23 meshes with the gear 16 from which the ratchet wheel 15 is driven and by connections as aforesaid the shaft 11, until the dog 14 and the ratchet wheel 15 are again engaged. It will also be understood, as above described, that the governor 42 acting through the weights thereon, prevents an excessive speed which would otherwise obtain through the power of the spring.

Because of the fact that the shoe 19 is sloped in the direction of the take-up roller 8 as shown in Fig. 2, should the shifting mechanism become inoperative it would be possible then to wind the film by hand through the handle 9 being turned in a clocklike direction. In that instance, the lower edge of the notch or hole in the film, held flat by spring 73 at the position 73ª, would simply wipe this shoe out of engagement with said notch or hole and cause the dog 14 to pivot about 18 as when an automatic shifting takes place. It can also be seen that control in the starting of the automatic shifting mechanism can be had through means of the same handle 9. A slight turning of said handle, as above, would cause the film, as above, to pivot said dog 14 out of engagement with the ratchet wheel 15 and thus start the automatic mechanism. The shoe 67, while shown in the same line with the shoe 19 need not necessarily be so, as it co-acts only with a surface of the film to the extent of bringing about the benefit for which it is intended. It is meant that the uniform pressure on it should not be released until all the film and paper have passed. Immediately thereafter the spring 69 causes the lever 68 to which said shoe 67 is attached, through the relief of the film pressure on said shoe, to pivot and get into position in the path of the bell crank lever 60 and prevent its operation. This in turn prevents the shutter trigger 65 from being operated and thus reminds the operator that there is no more film to be exposed and that also the last portion of paper has been wound. All that the operator need then do is to remove the cover 74 and remove the roller or spool 8 fully wound. It is also to be noted that the lever 66, when the film is being shifted, because of the dog 14 being then pivoted out of engagement with the ratchet wheel 15, is in a position obstructing the operation of the lever 60, and consequently prevents the shutter from being opened while the film is being shifted and a double exposure brought about on some portion of the last exposed film.

While we have shown and described one embodiment of our invention, it is obvious that it is not restricted thereto, but is broad enough to cover all structures that come within the scope of the annexed claims.

Having described our invention, what we claim is:

1. In a device of the class described, a camera with a shutter mechanism suitable for a variety of exposures, an automatic film shifting mechanism adapted to co-act with an intervally holed or notched film, controlling means in locking arrangement with said film shifting mechanism for starting said film shifting mechanism when out of engagement with said hole or notch, solid means operatively associated at all times between said shutter mechanism and said controlling means for actuating said controlling means directly from the shutter mechanism after a predetermined exposure has been completed, and means for causing the said film shifting mechanism to stop and be locked regardless of said film when the next hole or notch in said film is brought into engagement with said controlling means.

2. In a device of the class described, a camera with a shutter mechanism suitable for a variety of exposures, an automatic, power-driven film shifting mechanism adapted to co-act with an intervally holed or notched film, controlling means in locking arrangement with said film shifting mechanism for starting the shifting of said film when out of engagement with said hole or notch, solid means operatively associated at all times between said shutter mechanism and said controlling means for actuating said controlling means directly from the essential shutter mechanism after a predetermined exposure has been completed, and means for stopping the shifting of said film and locking said shifting mechanism regardless of said film when the next hole or notch therein has reached said controlling means.

3. In a device of the class described, a spring pressed dog, an automatic film shifting mechanism containing in its construction a winding key adapted to be removably attached to a take-up roller with means connected thereto for engagement with the spring pressed dog, a bell crank lever and means for mounting the same, a lever adapted to be depressed by said bell crank lever, a detent connected to said lever, a spring normally raising said last named lever, a pawl adapted to engage said detent and said dog and to disengage said dog from said means connected to said winding key, a spring connecting said detent and pawl, a snail cam adapted to engage said pawl and said detent and to separate the same, and means for mounting said cam so that it will stop when reaching engagement with said pawl regardless of whether the film shifting mechanism is still operating and without interference therewith.

4. In a device of the class described, a camera with a shutter mechanism suitable for a variety of exposures, an automatic film shifting mechanism adapted to co-act with an intervally holed or notched film, controlling means for starting said film shifting mechanism when out of engagement with said hole or notch, solid means operatively associated at all times between said shutter mechanism and said controlling means for actuating said controlling means directly from the shutter mechanism only after a predetermined exposure has taken place, and means for preventing the shutter mechanism from being operated while said controlling means is out of engagement with said hole or notch.

5. In a device of the class described, a camera with a shutter mechanism suitable for a variety of exposures, an automatic, power-driven film shifting mechanism adapted to co-act with an intervally holed or notched film, controlling means for starting the shifting of said film when out of engagement with said hole or notch, solid means operatively associated at all times between said shutter mechanism and said controlling means for actuating said controlling means directly from the essential shutter mechanism after a predetermined exposure has been completed, and means for preventing a succeeding exposure from being taken until the succeeding hole or notch in said film has reached engagement with said controlling means.

6. In a device of the class described, an automatic film shifting mechanism with means for shifting a film a predetermined, uniform distance, a shutter mechanism suitable for a variety of exposures, means operatively associated at all times between said film shifting mechanism and said shutter mechanism for controlling the starting of said film shifting mechanism directly from the shutter mechanism after a predetermined exposure has taken place, and means for preventing the shutter mechanism from being operated after the entire length of film has been shifted.

7. In a device of the class described, an automatic film shifting mechanism with means for shifting a film or other flexible layer a predetermined distance, a shutter mechanism adapted to be set in different ways for a variety of exposures, means operatively associated at all times between said film shifting mechanism and said shutter mechanism for automatically controlling the starting of said film shifting mechanism directly from the shutter mechanism after the shutter has been opened and closed regardless of the manner in which it has been set, and automatic means for preventing the shutter mechanism from being operated after the entire roll of film or flexible layer has automatically been shifted.

8. In a device of the class described, a camera casing with a removable cover, having an automatic film shifting mechanism mounted therein for shifting a film with a flexible layer extending beyond each end, means for carrying and winding said film and layer so that it will pass through the field of exposure, means whereby the first exposure length of said film will automatically be positioned upon replacing of said cover regardless of said layer, and means whereby the last portion of said layer will automatically be wound, upon completion of the last exposure length of said film.

9. In a device of the class described, a spring pressed dog, an automatic film shifting mechanism for shifting a film or other flexible layer a predetermined distance, said mechanism containing in its construction a winding key adapted to be removably attached to a take-up roller with means connected thereto for engagement with the spring pressed dog, a bell crank lever and means for mounting the same, a lever adapted to be depressed by said bell crank lever, a detent connected to said lever, a spring normally raising said last named lever, a pawl adapted to engage said detent and said dog and to disengage said dog from said means connected to said winding key, a spring connecting said detent and pawl, a snail cam adapted to engage said pawl and said detent and to separate the same, means for carrying said cam so that it will stop when in engagement with said pawl regardless of whether the shifting mechanism is still operating and without interference therewith, and means for preventing the bell crank lever from being operated after the entire length of film or layer has been shifted.

10. In a device of the class described, a camera casing containing mechanism for taking pictures on an intervally holed or notched film, said casing containing in its construction a removable cover, motor driven mechanism adapted to co-act with said hole or notch for automatically shifting the film a predetermined distance, a spring pressed dog resting normally in motor stopping position adapted to be engaged by film or to enter said holes or notches to control the starting and the stopping of said shifting mechanism, and auxiliary means, normally resting in motor stopping position when the cover is off and in motor releasing position when the cover is on.

11. In a device of the class described, a shutter mechanism suitable for a variety of exposures, an automatic film shifting mechanism with means for shifting an intervally holed or notched film a predetermined distance, said mechanism containing in its construction a spring pressed dog for engagement with said film and to enter said holes or notches to control the starting and stopping of said shifting mechanism, means for actuating said dog directly from the shutter mechanism automatically upon completion of predetermined exposure and connecting the shutter and shifting mechanism at all times, and means adapted to engage said film regardless of said holes or notches, for normally allowing said shutter mechanism to be operable when there is film in the field of exposure and inoperable when the film has passed.

12. In a device of the class described, an automatic, motor-driven film shifting mechanism for shifting an intervally holed or notched film, with means adapted to engage a hole or notch in said film for stopping said shifting mechanism after a predetermined length of film has been shifted, a shutter mechanism suitable for a variety of exposures, solid means operatively associated at all times between said shutter mechanism and said film shifting mechanism for automatically disengaging said first mentioned means after a predetermined exposure has been completed, mechanism for shifting the film by hand, and means for mounting said first mentioned means so that said film can be manually shifted when said motor is in stopping position without interfering with the automatic shifting mechanism or said first mentioned means manually disengaged to start said motor.

13. In a device of the class described, a camera casing containing mechanism for taking pictures on a film, said casing having a removable cover, an automatic, motor-driven film shifting mechanism mounted therein with controlling means for holding said motor released or for stopping the same, when in engagement with a surface of said film, or positioned in a hole or notch therein, respectively, receptive means for mounting said film when the cover is removed, mechanism for making the engaging portion of said controlling means automatically inoperable while said film is being mounted, and means connected to said cover for releasing said last named mechanism and for allowing said controlling means to operatively engage said film, automatically upon replacing of said cover.

14. In a device of the class described, a shutter mechanism suitable for a variety of exposures, an automatic film shifting mechanism with means for shifting a film a predetermined distance, a spring pressed dog with means to cause it to operatively engage said film, resting normally in motor stopping position, means connected at all times directly from the integral shutter mechanism and controlled and actuated thereby for causing said dog to release the motor automatically upon completion of predetermined exposure, said connecting means thereafter to return to normal position, and means for keeping said dog in motor releasing position, regardless of said connecting means, until a predetermined length of film has been shifted.

15. In a device of the class described, a camera having a shutter mechanism, a film shifting mechanism, a connecting mechanism for causing the operation of the shutter to start the operation of the film shifting mechanism and means adapted to bear on the film for preventing the operation of the shutter mechanism when said bearing means is off the film.

In witness whereof, we subscribe our signatures in the presence of two witnesses.

LOUIS W. ROSEN.
PINCUS BRAUNER.

Witnesses:
SAMUEL R. KAHN,
HENRY COHEN.